United States Patent [19]

Michnowski

[11] Patent Number: 4,496,606

[45] Date of Patent: Jan. 29, 1985

[54] GUAR GUM FOOD BAR

[75] Inventor: Jane Michnowski, Little Ferry, N.J.

[73] Assignee: Nabisco Brands, Inc., Parsippany, N.J.

[21] Appl. No.: 489,974

[22] Filed: Apr. 29, 1983

[51] Int. Cl.³ ............................................. A23L 1/04
[52] U.S. Cl. .................................. 426/658; 426/573; 426/810; 424/16; 424/34; 514/777
[58] Field of Search ................ 426/573, 810, 658; 424/363, 361, 16, 34, 195, 362

[56] References Cited

U.S. PATENT DOCUMENTS

| 201,878 | 4/1878 | Grivel | 426/573 |
| 1,111,917 | 9/1914 | Odegard | 426/810 |
| 2,176,086 | 10/1939 | Logan | 426/810 |
| 3,058,828 | 10/1962 | Lindbald | 426/810 |
| 3,185,574 | 5/1965 | Gabby et al. | 426/810 |
| 3,336,139 | 8/1967 | Mech et al. | 426/573 |
| 3,431,112 | 3/1969 | Durst | 426/810 |
| 3,434,843 | 3/1969 | Durst | 426/810 |
| 3,814,819 | 6/1974 | Morgan | 426/810 |
| 3,867,560 | 2/1975 | Menzi | 426/573 |
| 4,348,379 | 9/1982 | Kowalsky | 426/810 |

FOREIGN PATENT DOCUMENTS 3239 of 1900 United Kingdom ................ 426/810

*Primary Examiner*—Jeanette Hunter
*Attorney, Agent, or Firm*—Richard Kornutik

[57] ABSTRACT

Disclosed is a ready-to-eat high carbohydrate, low fat, high guar gum dietitic snack bar composition for a Type II diabetic comprising 50–75% carbohydrates, 10–15% protein, 8–15% fat and 8–12% guar gum.

9 Claims, No Drawings

GUAR GUM FOOD BAR

BACKGROUND OF THE INVENTION

1. Field of the Invention

The present invention relates to a high carbohydrate guar gum food bar consumed before or with meals to improve glucose tolerance and reduce insulin requirements for Type II diabetics.

2. Description of the Prior Art

Diabetes is the most common metabolic disorder. Diabetes (specifically called diabetes mellitus) is a disease apparently caused by failure of the pancreas to manufacture insulin, requiring daily injections of insulin (called Type I diabetes); or caused by excessive eating, requiring little or no insulin (Type II diabetes). The vast majority (estimated at 80%) of all diabetics are Type II diabetics. This latter type of diabetic is generally characterized by obesity, middle age or older, and having high blood levels of insulin. Hence, a Type I diabetic is characterized by a lack of insulin, while a Type II diabetic possesses an overabundance of insulin in the blood stream. Additional injected insulin is of little benefit to a Type II diabetic and conceivably may be potentially harmful.

The most important objective for Type II diabetics is loss of excess weight achieved by dietary modification and maintenance of normal body weight. Dietary modifications which will reduce weight and slow the rate at which glucose is absorbed often yield good control. Inclusion of foods high in complex carbohydrates and fiber as well as the micromineral nutrient chromium have been shown to favorably influence insulin response, and slowly cause the level of blood sugar to return to normal.

The obesity of Type II diabetics is the result of their excessive consumption of foods high in fats. Research shows a typical Type II diabetic consumes food of which about 37% is fat. Although Type II diabetics have a normally functioning pancreas, excessive glucose produced as a result of the excessive consumption of fats can sometimes cause the pancreas to produce a slight excess of insulin. But even if the pancreas produces a normal amount of insulin, the insulin is generally less effective due to a number of factors which promote lipid (fat) storage in obese diabetics causing a decrease responsiveness of muscle to the action of insulin (see "The Merck Manual", 12th Edition, published by Merck, Sharp and Dohme Research Lab., 1972, Rahway, N.J., pages 1130 and 1187.)

Maintaining dietary control for a Type II diabetic means reducing fat consumption and increasing insulin responsiveness. A typical diet designed for a Type II diabetic contains only 9% fat. The amount of protein consumed is generally about the same at all times. Thus, where a typical Type II diabetic was consuming about 43% carbohydrates and 37% fat, a proper diet for a Type II diabetic has about 70% carbohydrates and 9% fat. It is generally believed that maintenance of this diet progressively reduces lipid storage resulting in loss of excess weight.

It is well known that blood sugar rises rapidly after meals. Thus, the immediate need for insuline manufactured by the pancreas is highest shortly after meals. A Type II diabetic frequently produces excess insulin during the demand period because of the difficulty of the pancreas to determine the exact amount of insulin necessary. In order to aid the pancreas, a Type II diabetic could eat sparingly, throughout the entire day, avoiding big meals. This allows the pancreas to more accurately determine the exact amount of insulin necessary. However, this is an impractical diet therapy. Thus, the need exists for a method of permitting a diabetic to consume meals at meal times, and yet smoothly control the blood sugar rise which permits the pancreas to more accurately produce the exact amount of insulin necessary.

Although a high carbohydrate, low fat diet improves glucose tolerance and reduces insulin requirements, compliance with this dietary therapy is difficult and does not result in a smooth change in blood sugar. However, a high carbohydrate, high fiber, low fat diet will help level the glucose in the blood stream and stimulate a gradual release of insulin from the pancreas.

Fiber is an effective vehicle for delivering slow release carbohydrates. Fiber is mainly long chain polysaccharides which remain undigested as it passes through the body. Basically there are two types of fiber: (1) the insoluble fiber primarily from plants which increase stool bulk and decrease gastrointestinal residence time and; (2) the soluble type fiber consisting of pectins, polysaccharides and gums.

Diabetics are sensitive to soluble fiber (see: 1. Anderson, J. W. "Plant Fiber Treatment for Metabolic Diseases," published in Special Topics in Endocrinology and Metabolism, Vol. 2, by Cohen and Foa, published by Alan R. Liss, Inc. N.Y., 1981; 2. Jenkins, D. J. A. "Dietary Fiber and Other Anti-Nutrients: Metabolic Effects and Therapeutic Implications," published in Nutritional Pharmacology by Spiller, published by Alan R. liss, Inc., N.Y., 1981; and 3. Anderson and Chen, "Plant fiber: Carbohydrate and Lipid Metabolism" published in American Journal of Clinical Nutrition", Vol. 32, page 346, 1979.) Soluble fiber, when consumed, forms a gel in the stomach and small intestine that serves to trap simple sugars and bind bile acids. Thus, soluble fiber increases the residence time of food in the stomach and small intestines. The gel poses as a filter or barrier which nutrients must cross before being absorbed into the blood stream. By causing delay in the time for absorption by the blood stream, the residence time food spends in the stomach and small intestine is increased. Type II diabetics who maintain the high carbohydrate, high fiber diet maintain a more smooth rise in glucose level in the blood stream, which will gently stimulate insulin release. The high fiber diet calls for consuming more than 10 times the consumption of fiber in the typical American diet.

Soluble fibers are characterized by their ability to give highly viscous solutions at low concentrations. Gums are widely used in the food industry as gelling agents, stabilizing agents and suspension agents. All gums contain a portion which is hydrophilic which combines with water to form viscous solutions or gels.

Guar gum has become the most effective soluble fiber for treatment of Type II diabetes. Guar gum is obtained from the seed of the guar plant and was only discovered in the middle 1950's. It is generally a creamish white powder with a pH generally in the range of 5 to 7. Guar gum has a molecular weight in the range of 200,000–2,000,000 as reported in "Degradation of Guar Gum By Enzymes Produced by a Bacterium From the Human Colon by Balascio et al, published in the Journal of Food Biochemistry, Vol. 5, 1982, page 272, and forms viscous solutions at low concentrations such as, for example, 1%. At concentrations of 2% to 3% gels are formed.

The Food and Drug Administration has classified Guar as a generally recognized as safe (GRAS) substance for intentional use as a food additive, in the current estimated daily adult dose of 1.9 gm. Guar gum has been mixed with breads, soups, and crisp breads, as disclosed in "Guar Crisp Bread in the Diabetic Diet" authored by Jenkins et al; published in the British Medical Journal 2:1744,1978; and "Dietary Fiber and Blood Lipids: Treatment of Hypercholesterolemia with Guar Crisp Bread" authored by Jenkins et al; published in the American Journal of Clinical Nutritionists 33:575,1980.

Prior art guar gum soups and crispbreads are either therapeutically impractical, or require preparation before consumption. In particular, guar gum soups require mixing guar gum with canned soup and heating before consumption. Cooking increases the hydration rate making the guar gum more viscous and unpalatable. Furthermore, mixing and cooking require a diabetic to be home for meals, or prepare the soup for personal transportation in a thermos container. However, this is a great inconvenience. For example, dining out will be embarrassing when a diabetic displays the thermos container and will require many explanations.

Furthermore, guar gum soups are not high in carbohydrates and fiber, and low in fat. Guar gum tomato soup, for example, is high in fat but slightly deficient in carbohydrates based upon consumption of an equivalent weight of guar gum in the bar of the present invention.

Guar gum crispbread cannot incorporate a therapeutic amount of guar gum in each slice. Each slice of crispbread generally contains 1 g of guar gum. Typically, the average Type II diabetic would have to consume 20–30 slices per day—about 7–10 slices per meal. Crispbreads are similar in size, shape, texture and taste to soda crackers. Consuming 20–30 slices per day is impractical. If more guar gum is added to each slice of crispbread, the result is unpalatable and causes production difficulties. Excessive machining (mixing, extruding, etc.) causes guar gum to further thicken and gel, becoming very viscous, which results in an inedible product. Further, the necessary baking increases hydration of the guar gum making the product even more viscous and inedible.

Lastly, guar gum crispbread is not high in carbohydrates and fiber, and low in fat. While guar gum crispbread is low in fat, it is also low in carbohydrates based upon consumption of an equivalent weight of guar gum in the present invention.

Consequently, a need exists for a ready-to-eat guar gum food product, such as a snack, which can be quickly consumed and contains a therapeutic amount of guar gum. No cooking or excessive machining is desirable in the production of the food product, and it must be not only palatable, but tasty without leaving a dry mouth feeling nor a stickiness or thickness feeling as is generally the feeling with viscous ingredients.

Guar gum, satisfactory for use in food production, generally has a viscosity of 2600 to 3500 cps at 25° C. for 2 hours of a 1% solution tested on the Brookfield viscosimeter. However, not all guar gums within this viscosity make satisfactory food bars because of other factors, such as, their hydration rates or their substituent group or groups, which affect their hydration rate. Accordingly, it is important to employ a guar gum which does not become extremely viscous and sticky when added to ingredients of the food product, such that it is unpalatable and incapable of being swallowed.

SUMMARY OF THE INVENTION

The present invention concerns a ready-to-eat guar gum snack food bar for reducing insulin and permitting smooth blood sugar fluctuations for a Type II diabetic. The ready-to-eat guar gum bar is high in carbohydrates, low in fat and high in fiber (guar gum). In general, the liquid components of the bar are blended together. Guar gum is then added to the blended liquid and mixed until a homogeneous mixture results. The solids are mixed into the homogeneous mixture and the resuting composition is extruded at room temperature. The ready-to-eat bar has a low moisture content which helps prevent microbial growth and which aids in achieving a stable shelf life. The present guar gum bars have a shelf stability of at least three months.

The guar gum bars do not need any preparation before consumption. The bars are to be consumed before or during each meal.

Cooking hydrates guar gum making it viscous and unpalatable. The only heating necessary in the production of the ready-to-eat guar gum bar is employed for melting the confectioners coating. However, once the coating is melted, it is added to the room temperature liquid components. Then, the remaining room temperature ingredients are added to the liquid components, yielding a final composition at room temperature. Even the extrusion of the composition does not noticeably heat the extrudate. As a result of the present method, the ready-to-eat guar gum bars are chewy and palatable.

DESCRIPTION OF THE PREFERRED EMBODIMENTS

Guar gum employed in the present invention is characterized by a viscosity of approximately 3000 cps for the standard 1% solution at 25° C. for 2 hours as tested on a Brookfield viscosimeter. This guar gum is a medium course mesh powder, creamish white in color with a very low hydration rate. The pH is 6.5–7.5, with an Acid Insoluble Matter (sand or silica) of 0.03 to 1.0, with a gum by difference of 83–85%, with a mineral matter of 0.05 to 0.70%, with 0.2–2.0% other fiber, with 0.2–0.5% oil and 3.5–4.7% albuminoids (N×2.65). The guar gum used in the present invention yields a moist, chewy bar which is easily swallowed.

As previously disclosed, guar gum forms a gel in the stomach and lower intestine thus slowing glucose absorption. The effects of guar gum lasts several hours so that if consumed before or during each meal, control of blood sugar could be expected to be somewhat level throughout the digestion period.

A ready-to-eat guar gum food bar of the present invention contains on a percentage weight basis based on the total weight of the bar: carbohydrates approximately 50–75%, proteins approximately 10–15%, fats approximately 8–15%, guar gum approximately 8–12% and moisture of 8–12%. It has been found that 30 g of guar gum (daily) and 195–220 g of carbohydrate (daily) satisfactorily meet all the fiber—carbohydrate requirements of a Type II diabetic.

Manufacturing the bars generally calls for premixing the liquid components to obtain substantial homogeneity. The liquid components consist of a wetting agent such as molasses or shortening such as partially hydrogenated vegetable oil; a corn syrup and a melted commercially available confectioners compound coating.

The partially hydrogenated vegetable oil can be anyone of corn oil, palm oil, cotton seed oil, peanut oil, coconut oil, soybean oil, or the like, or a mixture of these. The corn syrup is generally a high fructose corn syrup.

Commercially available confectioners coating materials which melt or become pourable at temperatures preferably below about 140° F., more preferably below about 105° F., can be used in the ready-to-eat guar gum food bar. Premature solidification or thickening would greatly hinder uniform distribution of the coating material throughout the guar gum bar. Uniform distribution of the coating material serves to bind the ingredients together, provide cuttability, and reduced crumbliness. The commercially available coating material may be flavored or unflavored. However, additional flavorings may be added to the melted coating material.

As the melting or pour point decreases, the mobility of the coating material increases. Mobility at high temperature storage conditions results in loss of shape integrity and difficulty in retreving the bar from its packaging. Accordingly, it is preferable to use coating materials which are solid at about 90° F. or above but which melt or become pourable below about 105° F.

The confectioners coating material may be based upon cocoa butter or it may be a compound coating. The latter coating materials are based upon hardened vegetable oils. Compound coatings may be chocolate flavored, vanilla flavored, peanut flavored, coconut flavored, fruit flavored or the like. The principal ingredients in a coating are sugar and a fat. Typical hardened vegetable oils used in coating materials are hydrogenated cottonseed, coconut, soybean, palm, and peanut oils. Mixtures of confections's coating materials can be used. The compositions of typical coating materials are disclosed in Matz, *Cookie and Cracker Technology*, AVI Publishing Co., Westport, Conn., page 176, Table 45, (1968) which table is herein incorporated by reference.

After premixing the liquid components, the remaining (dry) components are added to the mixed liquids comprising salt, guar gum and (dry) carbohydrates. Optionally, commercially available flavoring such as cocoa and coconut can be added to improve the taste and texture.

Typical dry carbohydrates include flour, simple sugars, wheat germ and ready-to-eat cereals. The flour can be wheat flour, rye flour, peanut flour, barley flour, or the like, or a mixture of these.

Simple sugars are principally fructose, glucose (dextrose) and galactose. Fructose sugar is preferred. Other simple sugars may also be effective, but are less desirable because they are not as sweet as fructose and consequently more of the other simple sugars would be necessary to achieve the same degree of sweetness. The avoidance of sucrose and glucose (dextrose) is desirable because some diabetics cannot metabolize these sugars. Furthermore, there is a psychology involved because diabetics know sucrose sugar is unhealthy for them. By employing only simple sugar, a product directed to diabetics is more likely to gain acceptance. The only possible source of sucrose in the ready-to-eat guar gum bars of the present invention could stem from the confectioners coating.

Typically, the ready-to-eat cereals can be rice, wheat, corn, oats or any combination of these cereals. Oats are useful if a granola type guar gum bar is desirable. Rice cereals can be employed if it is necessary to reduce the fat content of a guar gum bar and increase the protein content. Corn cereals are employed if a golden yellow food bar is desirable. Wheat cereals are useful to form a satisfactory, workable dough. The caloric distribution as a percentage of calories of the food product of the present invention ranges from about 60–70% carbohydrates, 8–12% protein and 9–13% fat, with a range of 200–250 calories per bar.

Excessive water can lead to mold growth and short shelf life. If the percentage moisture is from 8 to 12%, a moist, chewy food product with a shelf stability of at least three months can be expected.

The mixed ingredients are extruded at room temperature in a conventional bar machine having opposing rollers which feed the mixture through a die. The die may be of any conventional shape such as rectangular, circular, semicircular, square and the like. The extrudate is cut into individual bars ranging from about 55–65 g with a wire or guillotine type cutter. Optionally, the bars can be cooled to about 40°–50° F. in a tunnel cooler to solidify and harden the product for packaging.

The bars are individually wrapped in a conventional material such as a film foil laminate. Optionally, the wrapping can be flushed with an inert gas, such as nitrogen, immediately before hermetically sealing the bar within the wrapping. Heremetically sealing helps prevent microbial growth by preventing moisture incorporation in humid conditions. On the other hand, in a dry environment, the sealing prevents loss of moisture from the bar which would cause hydration of the guar gum and cause the bar to become dry and crumbly.

The following examples set forth a moist guar gum food product for a diabetic diet which helps control insulin requirements.

EXAMPLE 1

CHOCOLATE GRANOLA GUAR GUM BAR

The chocolate granola guar gum bar comprises 16% oats, 6% simple sugars, 3.5% flavorings, 13% wheat germ, 0.5% salt, 11% guar gum, 27% corn syrup, 2% vegetable oil and 21% confectioners chocolate coating by weight.

The carbohydrates emanate primarily from oats, simple sugars, wheat germ and corn syrup. The protein stems mainly from oats, flavorings and wheat germ. The fat emerges principally from flavorings and vegetable oil. The fiber originates essentially from oats, wheat germ and guar gum.

The chocolate granola guar gum bars are prepared by melting the confectioners chocolate coating and mixing it with room temperature corn syrup and vegetable oil. To this liquid mixture the guar gum is added and uniformly dispersed. Then, the remaining ingredients at room temperature are admixed to achieve substantial homogeneity. Lastly, the mixture is extruded at room temperature and cut into bars weighing 60 g each. The serving size consists of two bars comprising, per serving, 490.5 calories, 71.33 g of carbohydrates of which 12.6 g is sucrose, 10 g of guar gum, 11.3 of protein, 14.3 g of fat, and 10.38% moisture. The caloric distribution is 21.16% fat, 9.25% protein and 64.59% carbohydrates.

EXAMPLE 2

PEANUT CRUNCH GUAR BAR

The peanut crunch guar bar comprises 19% flour, 7.5% simple sugars, 24% ready-to-eat cereals, 0.5% salt, 9% guar gum, 4% molasses, 27% corn syrup and 9% confectioners peanut coating.

The carbohydrates emanate primarily from flour, simple sugars, cereal, molasses and corn syrup. The protein stems mainly from flour and cereals. The fat emerges principally from flour. The fiber originates essentially from guar gum and cereals.

The peanut crunch guar gum bars are prepared by melting the confectioners peanut coating and mixing it with room temperature corn syrup and molasses. To this liquid mixture the guar gum is added and uniformly dispersed. Then, the remaining ingredients at room temperature are admixed to achieve substantial homogeneity. Lastly, this mixture is extruded at room temperature and cut into bars weighing 55 g each. The serving size consists of two bars comprising, per serving, 444.6 calories, 65.7 g of carbohydrates, 7 g of sucrose, 10 g of guar gum, 11 g of fat, 12.7 g of protein and 9.37% moisture. The caloric distribution is 12.34% fat, 11.46% protein and 66.19% carbohydrates.

What is claimed is:

1. A ready-to-eat guar gum dietetic food bar comprising: approximately 50–75% carbohydrates, 10–15% protein, 8–15% fat and 8–12% guar gum by weight, based on the total weight of the product.

2. The ready-to-eat guar gum dietetic food bar of claim 1 wherein the guar gum has a viscosity of about 3000 cps for a 1% solution at 25° C. for 2 hours as tested on a Brookfield viscosimeter.

3. The ready-to-eat guar gum dietetic food bar of claim 1 wherein said carbohydrates are selected from the group consisting of simple sugars, molasses, and corn syrup.

4. The ready-to-eat guar gum dietetic food bar of claim 1 wherein said protein is selected from the group consisting of flour, rice, oates, and wheat germ.

5. The ready-to-eat guar gum dietetic food bar of claim 1 wherein said fat includes vegetable oil.

6. A process for making a ready-to-eat dietetic food bar for treatment of diabetics comprising:
 (a) melting a confectioners coating and mixing molasses and corn syrup to form a homogenous liquid;
 (b) adding and uniformly dispersing guar gum with the homogenous liquid in a therapeutic quantity of between about 8 to about 12 percent by weight of the food bar;
 (c) mixing in flour, simple sugars and ready-to-eat cereals in amounts sufficient to produce a uniform composition.

7. The process of claim 6 wherein said uniform composition is extruded at room temperature and cut into bars.

8. The process of claim 6 wherein said uniform composition contains approximately 50–75% carbohydrates, 10–15% protein, 8–15% fat and 8–12% guar gum by weight, based on the weight of the bar.

9. The process of claim 6 wherein said simple sugars are selected from the group consisting of dextrose, fructose, glucose, and galactose.

* * * * *